Figures 1, 2:
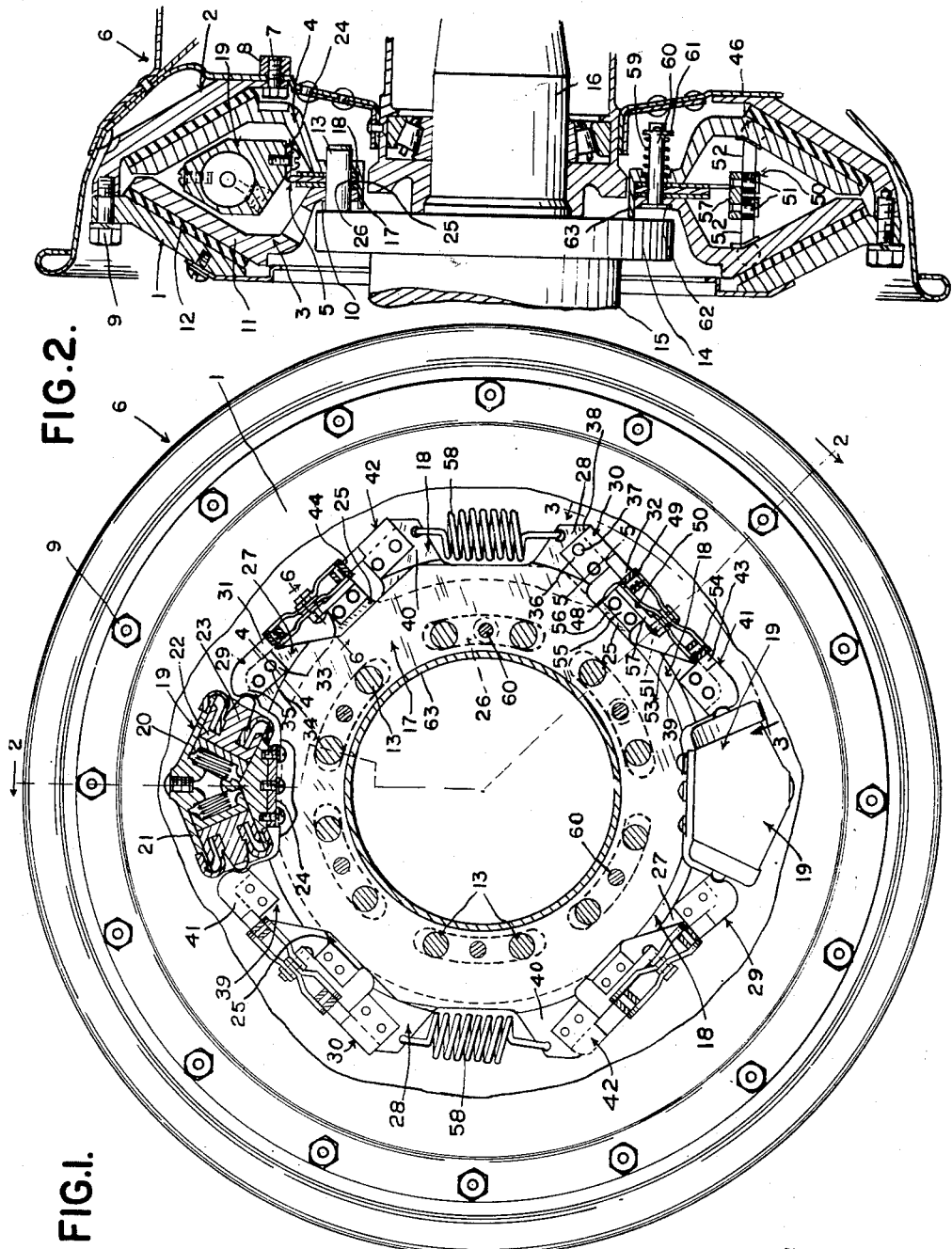

March 21, 1944.    P. M. FREER    2,344,690
BRAKE
Filed June 11, 1942    2 Sheets-Sheet 1

INVENTOR.
PHELPS M. FREER
BY
ATTORNEYS

March 21, 1944.　　　　P. M. FREER　　　　2,344,690
BRAKE
Filed June 11, 1942　　　　2 Sheets-Sheet 2

*INVENTOR.*
PHELPS M. FREER
BY

ATTORNEYS

Patented Mar. 21, 1944

2,344,690

UNITED STATES PATENT OFFICE 2,344,690

BRAKE

Phelps M. Freer, Detroit, Mich.

Application June 11, 1942, Serial No. 446,656

12 Claims. (Cl. 188—152)

The invention relates to brakes and refers more particularly to disc brakes.

The invention has for one of its objects to provide a brake which is so constructed that it is compact and very effective in operation.

The invention has for other objects to provide a brake comprising relatively rotatable friction members engageable with each other and actuating mechanism comprising a compression link which is adapted to exert a force directly proportional to the actuating force upon the link; to provide a brake in which the actuating mechanism comprises a compression link which maintains a substantially constant angular relation to the friction member upon which it acts to apply the brake; to provide a brake in which the actuating mechanism comprises compression links arranged in opposed balanced relation; to provide a brake in which the actuating mechanism comprises members movable angularly in opposite directions and pairs of opposed compression links with one pair opposed to another pair in balanced relation; and to provide a brake in which one of the relatively rotatable friction members is rotatable and another of the relatively rotatable friction members is non-rotatable, but movable angularly to a limited extent to secure a wrapping action.

The invention has for a further object to provide a simple mounting arrangement for the non-rotatable friction members and the actuating mechanism.

With these as well as other objects in view, the invention resides in the novel features of construction and combinations and arrangements of parts as more fully hereinafter set forth.

Figure 3:
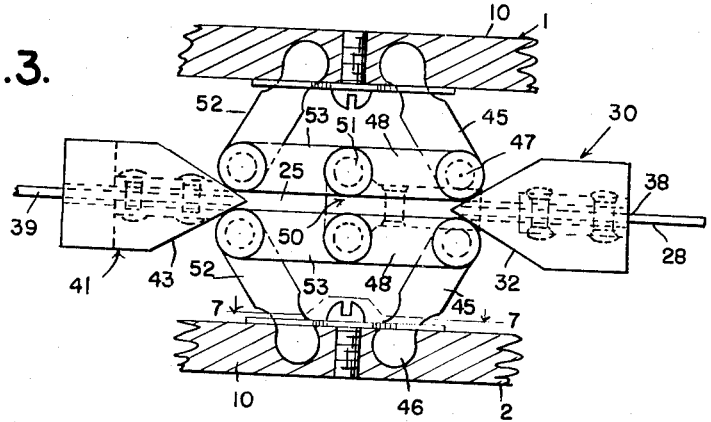
Figures 4, 5:
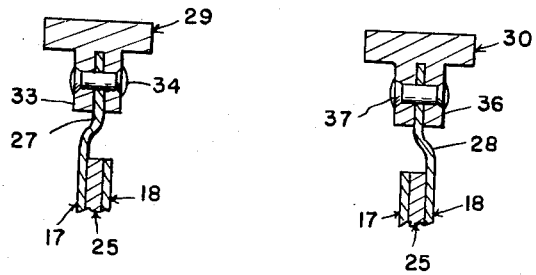
Figure 6:
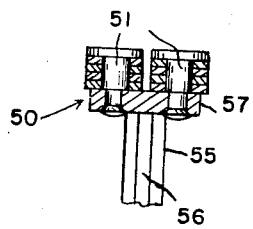
Figure 7:
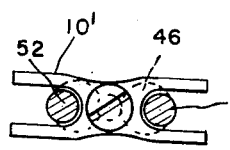

In the drawings:

Figure 1 is an inboard elevation, with parts broken away, of a brake embodying the invention;

Figures 2, 3, 4, 5, and 6 are cross sections on the lines 2—2, 3—3, 4—4, 5—5, and 6—6, respectively, of Figure 1;

Figure 7 is a cross section on the line 7—7 of Figure 3.

The brake, as illustrated in the present instance, is designed particularly for use with an airplane landing wheel, although it is apparent that it may be otherwise used, as with motor vehicle wheels and the like. The brake comprises the rotatable inboard and outboard friction members 1 and 2, respectively, the non-rotatable inboard and outboard friction members 3 and 4, respectively, extending between the rotatable friction members, and the actuating mechanism 5 for moving the non-rotatable friction members axially in opposite directions into engagement with the rotatable friction members.

Both the rotatable and non-rotatable friction members are in the nature of discs having radially outwardly converging friction surfaces The rotatable outboard friction member 2 is secured to the airplane landing wheel 6 by means of the bolts 7 and nuts 8 and the rotatable inboard friction member 1 is fixedly secured to the rotatable outboard friction member by means of the bolts 9 extending through the outer edge portion of the rotatable inboard friction member and threaded into the outer edge portion of the rotatable outboard friction member. The non-rotatable inboard and outboard friction members are symmetrically arranged and each has the inner mounting portion 10 and the outer friction portion 11, which latter has secured thereto the brake lining 12. The inner mounting portions 10 are angularly and axially slidable on the annular series of pins 13 which extend in an outboard direction from the flange 14 of the support 15 having the shaft 16 on which is journaled the wheel 6. The angular movement of the non-rotatable friction members is limited by forming each of their arcuate openings for receiving the pins to extend but a slight distance beyond each pin on both sides when the non-rotatable friction members are in off or inoperative position.

The actuating mechanism 5 comprises the inboard and outboard actuating discs 17 and 18, respectively, between the inner mounting portions 10 of the non-rotatable friction members. The actuating mechanism also comprises the diametrically opposite wheel cylinders 19 which are located within the space formed by the outer portions 11 of the non-rotatable friction members. Each of these wheel cylinders comprises the integral cylinders 20 and 21 having their axes inclined to each other and the pistons 22 slidable within the cylinders and provided with the rods 23 integral with their heads extending beyond the cylinders. Each of the wheel cylinders is fixedly secured to the peripheral flange 24 of the non-rotatable mounting disc 25 which extends between the actuating discs 17 and 18 and is formed with openings for receiving the pins 13, the pins holding the mounting disc from rotation. The actuating discs are movable angularly in opposite direction by means of the wheel cylinders and each disc is provided with the arcuate slots 26 through each of which extends a pair of pins 13, the slots of which being of sufficient length to permit the required angular movement of the actuating discs.

The actuating discs 17 and 18 are angularly movable in opposite directions to spread apart the non-rotatable inboard and outboard friction members into engagement with the rotatable inboard and outboard friction members. The inboard actuating disc 17 is angularly movable from its inoperative or off position in a clockwise direction, viewed in Figure 1, to apply the brake and, as shown, has the pairs of diametrically opposite radial projections 27 and 28 to which are fixedly secured the wedges 29 and 30, respectively. The wedges have V-shaped noses 31 and 32, respectively, pointing in a clockwise direction and having their apices midway between the inner mounting portions 10 of the non-rotatable inboard and outboard friction members, the radial projections being axially offset for this purpose. Each wedge 29 has the side walls 33 at opposite sides of the associated radial projection 27 and fixedly secured thereto as by means of the rivets 34. Each wedge also has the rear wall 35 fitting and abutting the rear edge of the associated radial projection and also engageable with the rod 23 of the piston slidable in the cylinder 20. Each wedge 30 has the side walls 36 at opposite sides of the associated radial projection 28 and fixedly secured thereto as by means of the rivets 37. Each wedge 30 abuts the shoulder 38 of the associated radial projection.

The outboard actuating disc 18 is formed in the same manner as the inboard actuating disc 17 with the pairs of diametrically opposite axially offset radial projections 39 and 40 to which are fixedly secured the wedges 41 and 42, respectively. The wedges 41 and 42 are formed in the same manner as the wedges 29 and 30, respectively, but have their V-shaped wedging noses 43 and 44, respectively, pointing in a counterclockwise direction, the outboard actuating disc being arranged reverse to the inboard actuating disc. Each of the wedges 41 are engageable with the piston rod of the piston slidable in the adjacent cylinder 21. The arrangement is such that there are two pair of wedges 29 and 42 facing each other and also two pair of wedges 30 and 41 facing each other. Between each pair there is linkage extending chordwise of the brake and forming part of the actuating mechanism for spreading apart the non-rotatable inboard and outboard friction members upon angular movement of the inboard and outboard actuating discs, respectively, in clockwise and counterclockwise directions. This linkage, as shown particularly in Figure 3, comprises the pair of opposed and balanced compression links 45 preferably having at their laterally outer ends the ball-shaped heads 46 for engaging correspondingly shaped recesses in the inner mounting portions 10. The laterally inner ends of the compression links are pivotally connected by the radial pins 47 to the links 48 and 49 which extend parallel to the mounting disc 25 and are pivotally connected to the bracket 50 by the pair of radial pins 51. The laterally inner ends of the compression links engage opposite sides of the wedging nose 32 and the compression links are arranged at a predetermined angle of inclination to the inner mounting portions 10 so that upon movement of the wedge 30 in a clockwise direction the inner mounting portions 10 will be spread apart. By reason of the compression links being pivotally connected at their laterally inner ends to other pivotal links, the compression links maintain a substantially constant angularity to the inner mounting portions of the non-rotatable friction members during the application of the brake, irrespective of brake lining wear, there being but a very slight change. The linkage also comprises the pair of opposed and balanced compression links 52, the laterally inner ends of which are engageable with the opposite sides of the wedging nose 43 of the wedge 41. The compression links 52 are formed in the same manner as the compression links 45 and their laterally inner ends are pivotally connected to the links 53 and 54 which are pivotally mounted upon the bracket 50 by the pins 51. The pair of compression links 52 are inclined to the inner mounting portions 10 at the same angle, but in an opposite direction, as the angle of inclination of the compression links 45. As a result, the pair of compression links 52 is opposed to and counterbalances the pair of compression links 45.

Spring clips 10' secured to the inner mounting portions 10 have forks at their ends straddling the necks of the compression links 45 and 52 and engaging the ball-shaped heads of the compression links to retain the latter in engagement with the inner mounting portions.

Each bracket 50 is formed with the side walls 55 which are located at opposite sides of the radial projection 56 upon the mounting disc 25 and the side walls are fixedly secured as by means of rivets to the radial projection. The bracket is also formed with the end projection 57 to which are secured the pins 51 at opposite sides of the radial projection, if extended.

For returning the actuating discs to their inoperative or off positions, there are the pair of diametrically opposite coils springs 58 which are connected to the radial projections 28 and 40. The inoperative or off positions are determined by the pins 13 engaging the ends of the arcuate slots 26.

To move the non-rotatable inboard and outboard friction members toward each other and away from the rotatable inboard and outboard friction members upon release of braking fluid pressure, I have provided the annular series of axial rods 60 and coil springs 59 encircling the axial rods 60 and abutting the inner mounting portion 10 of the non-rotatable outboard friction member and the collars 61 upon the rods. The rods extend through the inner mounting portions 10, the actuating discs 17 and 18, and the mounting disc 25 and preferably have the heads 62 abutting the inner mounting portion of the non-rotatable inboard friction member. It will be noted that the rods extend through the arcuate slots 26 in the actuating discs so that the latter are free to be moved angularly. It will also be noted that clearance is provided between the rods and the edges of the holes in the mounting disc to provide for limited angular movement of the non-rotatable friction members.

For the purpose of centering the assembly comprising the non-rotatable inboard and outboard friction members, the angularly movable actuating discs and the non-rotatable mounting disc, the non-rotatable outboard friction member 4 is formed at its inner edge with the axial flange 63 upon which the other parts of the assembly may be sleeved prior to assembling this assembly with the rotatable friction members.

With the parts of the brake in off or inoperative position and the rotatable friction members 1 and 2 rotating in a counterclockwise direction, as indicated by the arrow in Figure 1, the forcing of braking fluid under pressure to the wheel cylinders 19 causes the inboard and outboard actuating discs 17 and 18, respectively, to move in clockwise and counterclockwise directions, respectively. As a result, the laterally inner ends of the compression links 45 and 52 are moved away from each other by the wedges upon the actuating discs and the non-rotatable friction members 3 and 4 are moved into engagement with the rotatable friction members 1 and 2, respectively. After this engagement takes place, the non-rotatable friction members move angularly to a limited extent in a counterclockwise direction and have a wrapping action and react on the compression links 45. The compression links, however, can not move the actuating disc 17 in a counterclockwise direction because the compression links are arranged at an angle to the wedging surfaces to prevent this movement. The actuating disc 18 with its compression links 52 follow up the non-rotatable friction members during their limited angular movement so that after the non-rotatable friction members have reached the end of their limited angular movement the compression links 52 will balance the compression links 45. During the application of the brake the mounting disc 25 serves as a device for anchoring the non-rotatable friction members. When the wheel cylinders are relieved from braking fluid under pressure, the coil springs 58 and 59 serve to return the parts to their inoperative or off positions.

With the construction as above described, it will be noted that the radial pivot pins for the linkages or sets of links are arranged diametrically opposite each other and are spaced 90° apart and that there are four linkages or sets of links for spreading apart the non-rotatable inboard and outboard friction members. It will also be noted that each of the actuating discs is adapted to be angularly moved from its off or inoperative position by the pistons in two cylinders and that both of the actuating discs are angularly movable at the same time. It will be further noted that by reason of the wedging action of the actuating mechanism and also the limited wrapping action of the non-rotatable friction members a very powerful force may be exerted to apply the brake. In addition, it will be noted that the compression links are arranged in pairs with the compression links of each pair in opposed balanced relation and with the pairs themselves in opposed balanced relation.

What I claim as my invention is:

1. A brake comprising relatively rotatable friction members relatively movable axially into engagement and means for relatively moving said friction members axially into engagement comprising an actuating member at one side of one of said friction members and movable angularly through a path substantially parallel to said last mentioned friction member, and a compression link between said actuating member and said last mentioned friction member and extending transversely of the latter, said compression link maintaining a substantially constant angular relation to said last mentioned friction member.

2. A brake comprising rotatable friction members, non-rotatable friction members between and movable axially away from each other into engagement with said rotatable friction members, an actuating member between and movable angularly about the axes of and through a path substantially parallel to said non-rotatable friction members, and compression links between said actuating member and said non-rotatable friction members and extending transversely of the latter, said compression links maintaining substantially constant angular relation to said non-rotatable friction members.

3. A brake comprising rotatable friction members, non-rotatable friction members between and movable axially away from each other into engagement with said rotatable friction members, actuating members between said non-rotatable friction members and angularly movable in opposite directions at the same time through paths substantially parallel to said rotatable friction members, and compression links between and extending transversely of said actuating members and said non-rotatable friction members maintaining substantially constant angular relations to said non-rotatable friction members irrespective of wear.

4. A brake comprising rotatable friction members, non-rotatable friction members between and movable axially away from each other into engagement with said rotatable friction members, actuating members between said non-rotatable friction members and angularly movable in opposite directions at the same time, a non-rotatable mounting member between said actuating members, and compression links pivotally connected to said non-rotatable friction members and mounting member and actuated by said actuating members.

5. A brake comprising rotatable friction discs, non-rotatable friction discs between and movable axially away from each other into engagement with said rotatable friction discs, actuating discs between said non-rotatable friction discs and angularly movable in opposite directions at the same time, a non-rotatable mounting disc between said actuating discs, links pivotally connected to said non-rotatable mounting disc, opposed compression links pivotally connected to said non-rotatable friction discs and links, and wedges on said actuating discs for engaging said compression links.

6. A brake comprising rotatable friction discs, one of said rotatable friction discs being mountable on a wheel and carrying the other of said friction discs, a non-rotatable support provided with an annular series of axially extending pins, non-rotatable friction discs having inner portions slidably mounted on said pins and outer portions located between said rotatable friction discs, angularly movable actuating discs slidably mounted on said pins and located between said inner portions, a non-rotatable mounting disc mounted on said pins and extending between said actuating discs, diametrically opposite wheel cylinders mounted on said mounting disc and located between said outer portions and having pistons abutting said actuating discs for angularly moving the same, and means between said non-rotatable friction discs and actuating discs for spreading the former apart upon angular movement of the latter.

7. A brake comprising rotatable friction members, non-rotatable friction members between and movable axially away from each other into engagement with said rotatable friction members, wedging means, and compression links between said non-rotatable friction members and wedging means, said compression links extending transversely of said non-rotatable friction members and maintaining substantially constant angular relation to said non-rotatable friction members.

8. A brake comprising rotatable friction members, non-rotatable friction members between and movable axially away from each other into engagement with said rotatable friction members, an actuating member movable angularly through a path substantially parallel to said rotatable friction members, and compression links arranged in opposed balanced relation between said actuating member and said non-rotatable friction members and extending transversely of the latter for axially moving the latter.

9. A brake comprising rotatable friction members, non-rotatable friction members between and movable axially away from each other into engagement with said rotatable friction members, said non-rotatable friction members having limited angular movement upon engagement with said rotatable friction members, actuating members angularly movable in opposite directions at the same time, and pairs of compression links between said actuating members and said non-rotatable friction members for axially moving the latter, said pairs being in opposed balanced relation and the compression links of each pair being in opposed balanced relation.

10. A brake comprising rotatable friction discs, non-rotatable friction discs between and movable axially away from each other into engagement with said rotatable friction discs, angularly movable actuating discs between said non-rotatable friction discs, a non-rotatable mounting disc extending between said actuating discs, means mounted on said mounting disc for angularly moving said actuating discs, and means upon one of said non-rotatable friction discs for positioning the other of said non-rotatable friction discs, said actuating discs, and said mounting disc relative to said first mentioned non-rotatable friction disc.

11. A brake comprising rotatable friction members, non-rotatable friction members between and movable away from each other into engagement with said rotatable friction members, said non-rotatable friction members having limited angular movement upon engagement with said rotatable friction members, and means for moving said non-rotatable friction members away from each other comprising actuating members movable angularly in opposite directions at the same time through paths substantially parallel to said non-rotatable friction members, said actuating members each having a wedge, and a pair of opposed compression links between said non-rotatable friction members and each wedge, said compression links extending transversely of said non-rotatable friction members and certain of said compression links serving upon angular movement of said non-rotatable friction members to increase the pressure of said non-rotatable friction members on said rotatable friction members.

12. A brake comprising rotatable friction members, non-rotatable friction members between and movable away from each other into engagement with said rotatable friction members, said non-rotatable friction members having limited angular movement upon engagement with said rotatable friction members, and means for moving said non-rotatable friction members away from each other comprising actuating members movable angularly in opposite directions at the same time and pairs of opposed compression links between said non-rotatable friction members and actuating members, certain of said compression links serving upon angular movement of said non-rotatable friction members to increase the pressure of said non-rotatable friction members on said rotatable friction members.

PHELPS M. FREER.